Apr. 3, 1923.

R. C. DOHE

FILM REPAIR TOOL

Filed July 14, 1921

1,450,795

Inventor
Russell C. Dohe,
By G. Hume Talbert
Attorney

Patented Apr. 3, 1923.

1,450,795

UNITED STATES PATENT OFFICE.

RUSSELL C. DOHE, OF OKEENE, OKLAHOMA.

FILM-REPAIR TOOL.

Application filed July 14, 1921. Serial No. 484,657.

*To all whom it may concern:*

Be it known that RUSSELL C. DOHE, a citizen of the United States of America, residing at Okeene, in the county of Blaine and State of Oklahoma, has invented new and useful Improvements in Film-Repair Tools, of which the following is a specification.

The object of the invention is to provide simple and efficient means for repairing moving picture films when the sprocket openings thereof become cracked or broken in the operation of displaying the same.

It is a common experience in the moving picture industry that after a film has been used or exhibited a few times certain of the sprocket openings therein by which the feeding of the film is accomplished become mutilated to some extent, the celluloid cracking toward the edges of the film and finally breaking loose with the result that the projecting edges at the break interfere with the proper feeding movements of the film and therefore it is the common practice at the film exchange depots to employ inspectors to examine the films in the intervals between the use thereof or prior to issuing the same to examine the films and trim them by removing the projecting edges at the broken sprocket openings, usually by means of shears or scissors, with the result that unless great care is exercised the adjacent sprocket openings are weakened or injured and as a consequence a further break is rendered possible and even likely, and the ultimate utility of the film is impaired unnecessarily. It is therefore the object of the invention to provide a means for removing the rough edges or projecting portions incident to the breaking out of the sprocket openings, which appears to be unavoidable by reason of the strain applied by the sprocket wheels of the machine to the celluloid, and the relative brittleness of the latter, so as to adapt the film to feed freely through the projector without the possibility of catching the guides or sprockets, and to accomplish this object without the risk of injuring the adjacent sprocket openings, and hence without detracting from the durability of the film.

With this object in view the invention consists in a construction and combination of parts of which a preferred embodiment is shown in the accompanying drawings, wherein:—

Figure 1:
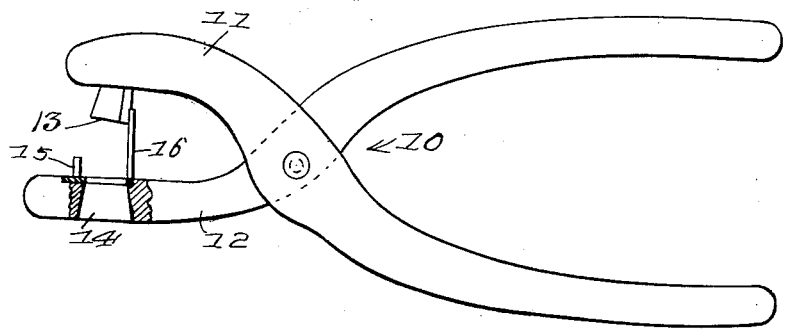
Figure 1 is a side view of a tool embodying the invention.
Figure 2:
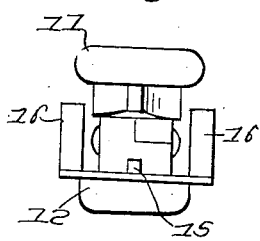
Figure 2 is an end view of the same.
Figure 3:
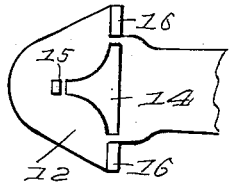
Figures 3 and 4 are plan views respectively of the facing jaws of the tool.
Figure 4:
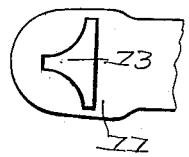

The tool consists essentially of a pair of pivotally connected handles 10 having jaws 11 and 12 of which the former carries a knife 13 while the latter is provided with a complemental socket 14, said knife and socket corresponding in contour and operating as die members to the end that when brought into operative relation they serve to remove a portion of an interposed film corresponding in contour therewith. The socket carrying jaw is also provided with a positioning stud 15 adapted to fit in the inner end of a broken or mutilated sprocket opening of the film with the object of properly positioning the jaws of the tool with relation to the broken sprocket and with the proper openings in the adjacent sprocket openings of the film and also carried by the jaw 12 of the tool is a guide flange 16, preferably divided as shown with portions thereof arranged at opposite sides of the die members and adapted to be placed in contact with the edge of the film to limit the depth of the cut formed in the film and thus constitute what may for convenience be termed a depth gage.

Figure 5:
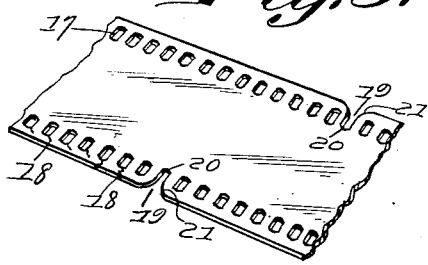
Figure 5 is a view of a portion of a film.

In Figure 5 there is shown a section of a film wherein at 17 there are illustrated sprocket openings of normal size and position while at 18 are shown openings which indicate signs of breakage or injury by fine cracks leading from the openings toward the edge or margin of the film and which by reason of such cracks are liable to become broken out in the use of the film. Also at 18 there are shown sprocket openings which have become definitely mutilated by the breaking of the marginal portion of the film with resultant projecting edges which as above explained are liable to catch in the guides of the projector and interfere with the progressive movement of the film, while at 19 there is shown a repair produced by a tool constructed in accordance with the invention merely by applying the jaws with the guide stud 15 at the inner end of the sprocket opening 20 and closing the jaws so as to cut away the loose portions of the celluloid and leave rounded edges 21 without in any way detracting from the strength or serving to weaken the adjacent sprocket openings.

The trimming of the film with relation to each sprocket opening can be effected in one operation of the tool and without the exercise of special care other than to position the guide stud in the broken sprocket opening. The closing of the jaws when the tool is properly positioned, which must be if the stud is inserted in the broken sprocket opening, results in the cutting away of the surplus material and leaving rounded edges which freely pass through the guides of the projector and permit of the use of the film with the same facility as prior to any injury to the same.

Having described the invention, what is claimed as new and useful is:—

1. A tool for repairing moving picture films having pivotally connected jaws carrying complemental die members for removing the portions of a film adjacent to a broken sprocket opening thereof to form outwardly divergent free edges, one of said jaws carrying a positioning stud for engagement with the mutilated sprocket opening of the film.

2. A tool for repairing moving picture films having pivotally connected jaws carrying complemental die members for removing the portions of a film adjacent to a broken sprocket opening thereof to form outwardly divergent free edges, one of said jaws carrying a positioning stud for engagement with the mutilated sprocket opening of the film, and a depth gauge for contact with the marginal edge of the film.

In testimony whereof he affixes his signature.

RUSSELL C. DOHE.